US00RE38905E

(19) United States
(12) Reissued Patent
Wei

(10) Patent Number: US RE38,905 E
(45) Date of Reissued Patent: Dec. 6, 2005

(54) TOOL BOX

(75) Inventor: Yong Lung Wei, Taichung (TW)

(73) Assignee: Maxtech, Inc., Roseville, MI (US)

(21) Appl. No.: 09/834,059

(22) Filed: Apr. 12, 2001

Related U.S. Patent Documents

Reissue of:
(64) Patent No.: 5,893,457
Issued: Apr. 13, 1999
Appl. No.: 09/058,454
Filed: Apr. 10, 1998

(51) Int. Cl.[7] ..... B65D 85/00
(52) U.S. Cl. ..... 206/373; 206/377; 206/378; 312/902
(58) Field of Search ..... 190/17, 18 R; 206/370, 372–379, 570, 581, 739, 743, 744, 751–755, 758; 211/74, 79–82; 220/528; 312/24, 27, 28, 135, 136, 266, 270.2, 271, 304, 902, 114

(56) References Cited

U.S. PATENT DOCUMENTS

| | | | | |
|---|---|---|---|---|
| 841,551 | A | * | 1/1907 | Loomis |
| 1,732,214 | A | | 10/1929 | Amez-Droz |
| 1,859,401 | A | | 5/1932 | Lengsfreld |
| 1,882,756 | A | * | 10/1932 | Boynton |
| 1,966,351 | A | | 7/1934 | Lewis |
| 2,401,667 | A | * | 6/1946 | Segur |
| 2,403,825 | A | | 7/1946 | Nissenbaum |
| 2,408,227 | A | | 9/1946 | Ramsey |
| 2,427,218 | A | | 9/1947 | Liebson |
| 2,589,593 | A | | 3/1952 | Anderson et al. |
| 2,708,508 | A | | 5/1955 | Marsh |
| 2,775,342 | A | * | 12/1956 | Smith |
| 3,074,539 | A | * | 1/1963 | Rogovin |
| 3,086,645 | A | | 4/1963 | Yount |
| 3,111,915 | A | * | 11/1963 | Gray ..... 211/150 |
| 3,353,657 | A | | 11/1967 | Young |
| 3,583,556 | A | | 6/1971 | Wagner |
| 4,006,821 | A | | 2/1977 | Sautter |
| 4,091,918 | A | | 5/1978 | Soulakis et al. |
| 4,493,417 | A | | 1/1985 | Ackeret |
| 4,531,646 | A | * | 7/1985 | Howard ..... 211/150 |
| 4,660,902 | A | * | 4/1987 | Resendez, Jr. ..... 312/114 |
| 4,768,652 | A | * | 9/1988 | Fallon |
| 4,930,628 | A | | 6/1990 | Bridges |
| 5,244,265 | A | | 9/1993 | Chiang |
| 5,368,164 | A | | 11/1994 | Bennett et al. |
| 5,497,875 | A | | 3/1996 | Kuo |
| 5,533,625 | A | | 7/1996 | Mikkelsen |
| 5,562,208 | A | | 10/1996 | Hasler et al. |
| 5,570,784 | A | | 11/1996 | Sidabras et al. |
| 5,609,322 | A | * | 3/1997 | Bond ..... 206/373 |
| 5,626,227 | A | | 5/1997 | Wagner et al. |
| 5,676,254 | A | | 10/1997 | Cheng et al. |

(Continued)

FOREIGN PATENT DOCUMENTS

| | | |
|---|---|---|
| DE | 16850 | 10/1898 |
| DE | 656952 | 2/1938 |
| GB | 404074 | 1/1934 |

*Primary Examiner*—Jim Foster
(74) *Attorney, Agent, or Firm*—James R. Frederick; Ware, Fressola, Van Der Sluys & Adolphson LLP

(57) ABSTRACT

A tool box includes a base portion with two side walls, two sliding plates slidably disposed to the two side walls and a plurality of receiving members pivotally connected between the two side walls at two ends of a front side thereof. The receiving members further are pivotally connected to the two sliding plates at the two ends of a rear side thereof. An actuating member is pivotally connected between the two side walls at two ends of a front side thereof, and between the two sliding plates at the two ends of a rear side thereof so that when pivoting the actuating member about the two ends of the front side thereof, the two sliding plates and the rear side of each the receiving members are moved upwardly.

17 Claims, 4 Drawing Sheets

AMENDED

U.S. PATENT DOCUMENTS 5,746,316 A * 5/1998 La Barre
5,775,499 A 7/1998 Budert
5,803,254 A * 9/1998 Vasudeva ..... 206/373
5,887,715 A * 3/1999 Vasudeva ..... 206/373
5,893,457 A 4/1999 Wei
6,105,767 A * 8/2000 Vasudeva ..... 206/372
6,105,770 A * 8/2000 Vasudeva ..... 206/378

* cited by examiner

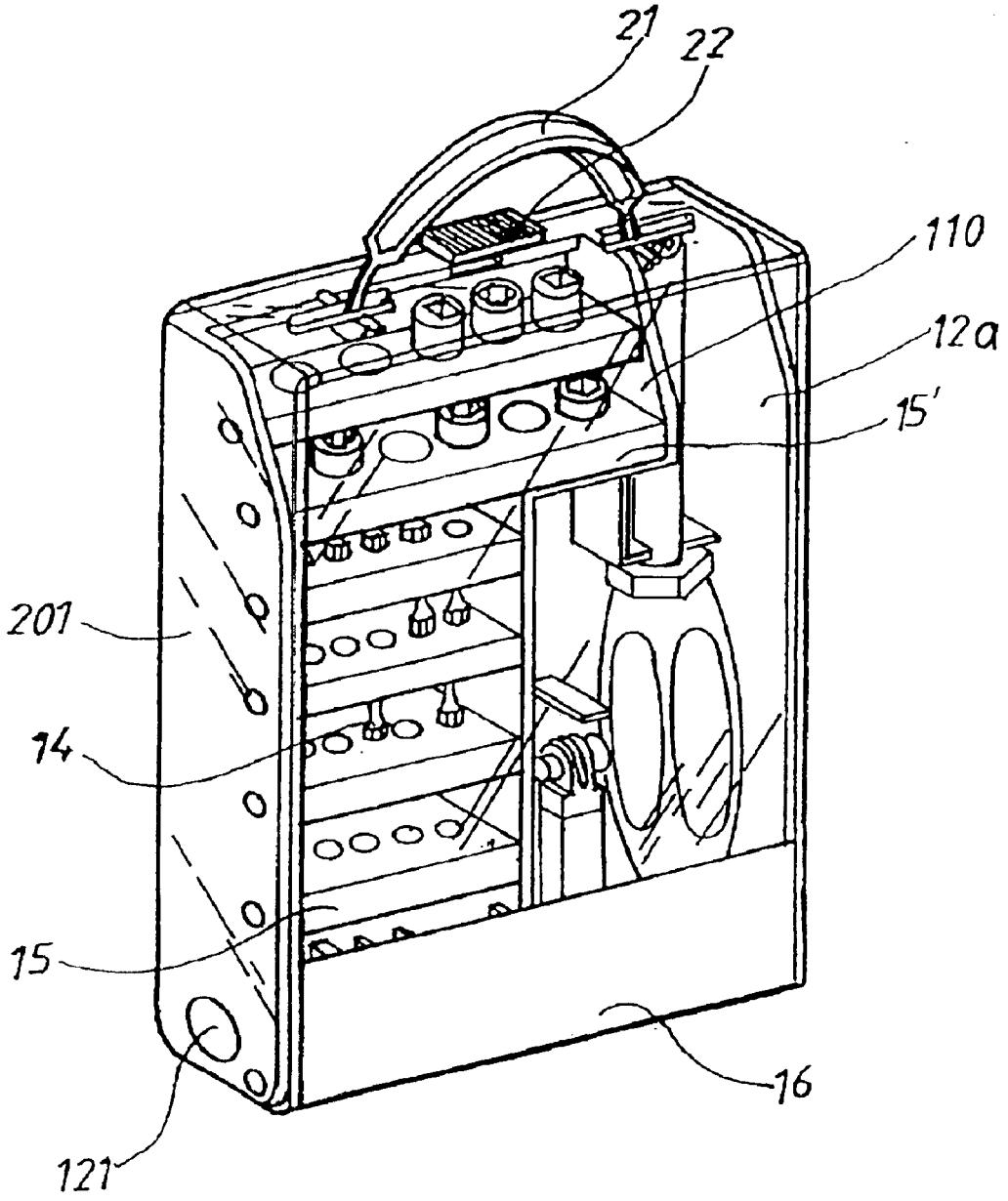
FIG.1 AMENDED

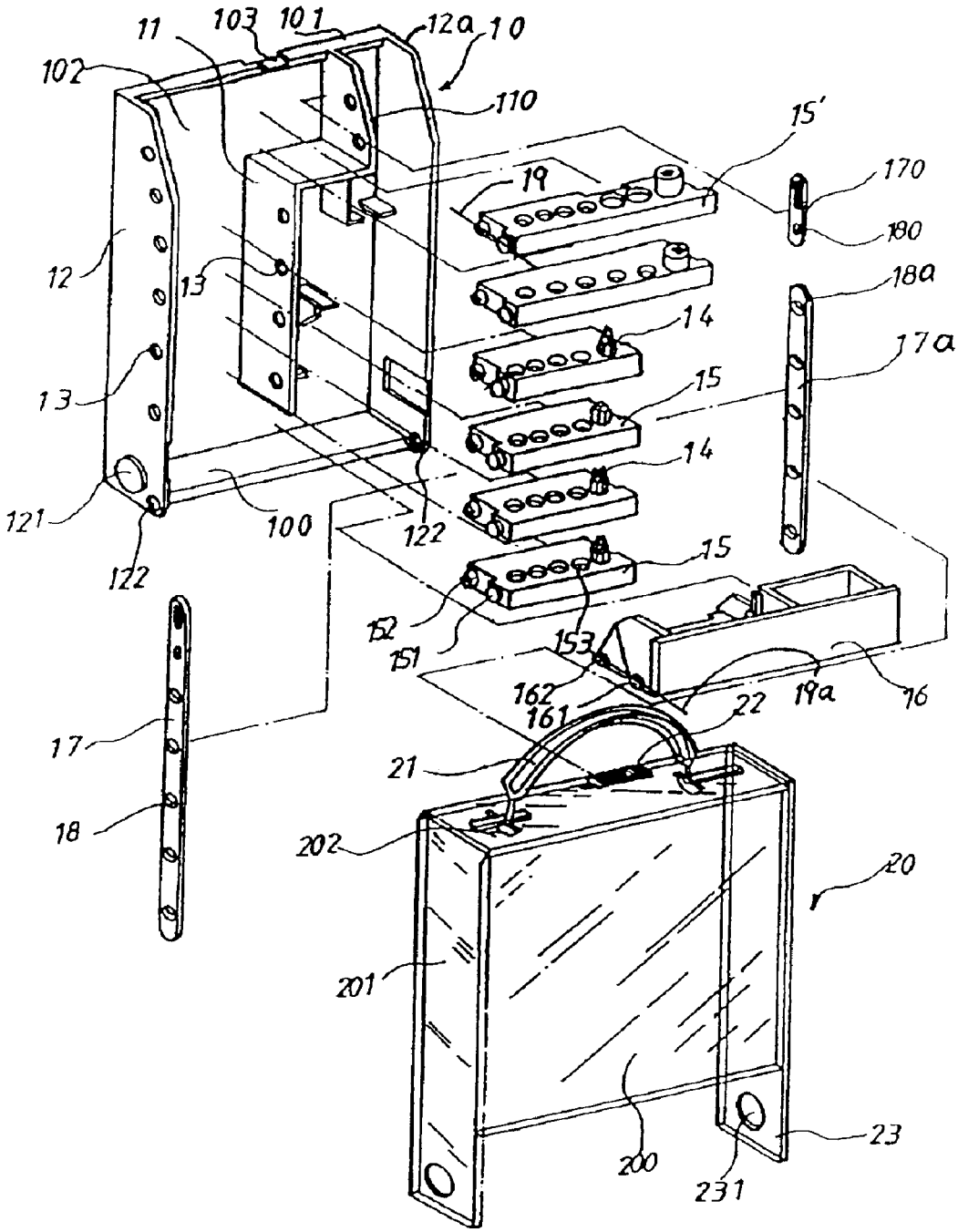
FIG. 2 AMENDED

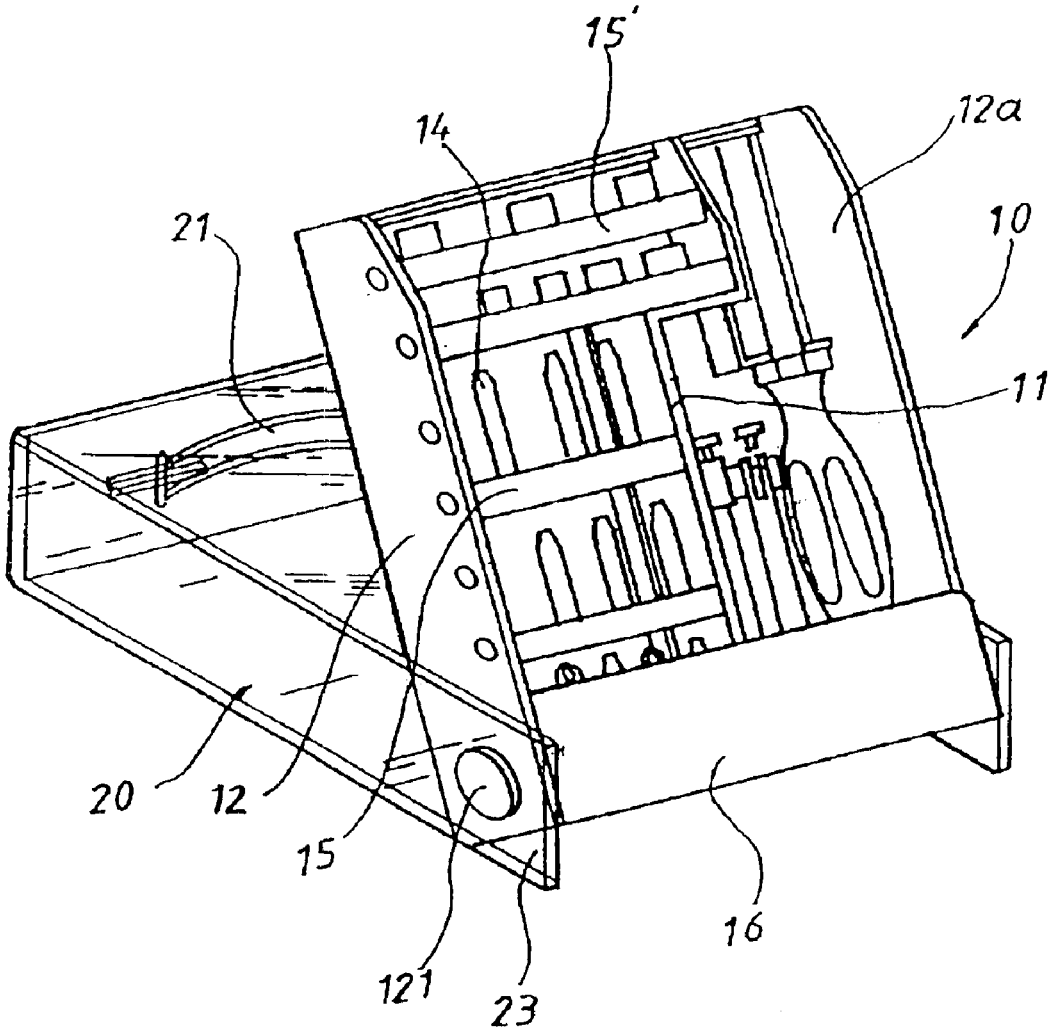
FIG. 3 AMENDED

TOOL BOX

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a tool box comprising a plurality of receiving members pivotally connected between two sliding plates which are actuated by an actuating member so that when operating the actuating member, the receiving members are pivoted an angle corresponding to a horizontal plane.

2. Brief Description of the Prior Art

Conventional tool boxes generally includes a base portion and a cover which is pivotally connected to the base portion in which a plurality of recesses are defined so as to receive tools therein. Those recesses are integrally defined in the base portion so that there are limitations of types and/or shapes of tools to be received. Furthermore, the base portion is designed to put on a horizontal surface so that a user has to search the tools received in the recesses because some tools disposed in a faraway side of the base portion could be hidden, and the tools have to be picked vertically from the recesses and this action is not convenient for the user, a preferred direction of picking the tools is about 45 degrees corresponding to the horizontal plane. These shortcomings can be seen in most of the tool boxes presented in the market.

The present invention provides an improved tool box including a base portion and a cover wherein a plurality of receiving members are pivotally connected between two sliding plates which are actuated by an actuating member so as to slide the sliding plates to let all the receiving members be pivoted inclinedly. Therefore the above mentioned shortcomings may be mitigated.

SUMMARY OF THE INVENTION

In one aspect of the present invention, there is provided a tool box comprising a base portion having two side walls between which a bottom and a top are respectively transversely connected, and a back wall connected between two rear sides of the two side walls. [Two] *One* sliding plate[s are] *is* respectively and slidably disposed to *one of* the side walls corresponding thereto. At least one receiving member [is] *and an actuating member are* pivotally connected [between] *to* the [two] *said* side walls at [two] *the respective* ends of [a] front side*s* thereof and pivotally connected [between] *to* the sliding plate[s] at [the two] *corresponding respective* ends of [a] *the* rear side*s* thereof.

It is an object of the present invention to provide a tool box having a plurality of receiving members which are operated to be inclined corresponding to a horizontal plane.

It is another object of the present invention to provide a tool box which has two sliding plates between which the receiving members are pivotally connected.

How these and other objects are accomplished will become apparent from the following descriptions and from the drawings.

BRIEF DESCRIPTION OF THE DRAWINGS

FIG. 1 is a perspective view of a tool box in accordance with the present invention;

FIG. 2 is an exploded view of the tool box in accordance with the present invention;

FIG. 3 is a perspective view of the tool box when a cover is pivoted corresponding to a base portion thereof.

DETAILED DESCRIPTION OF THE PREFERRED EMBODIMENT

Figure 4:
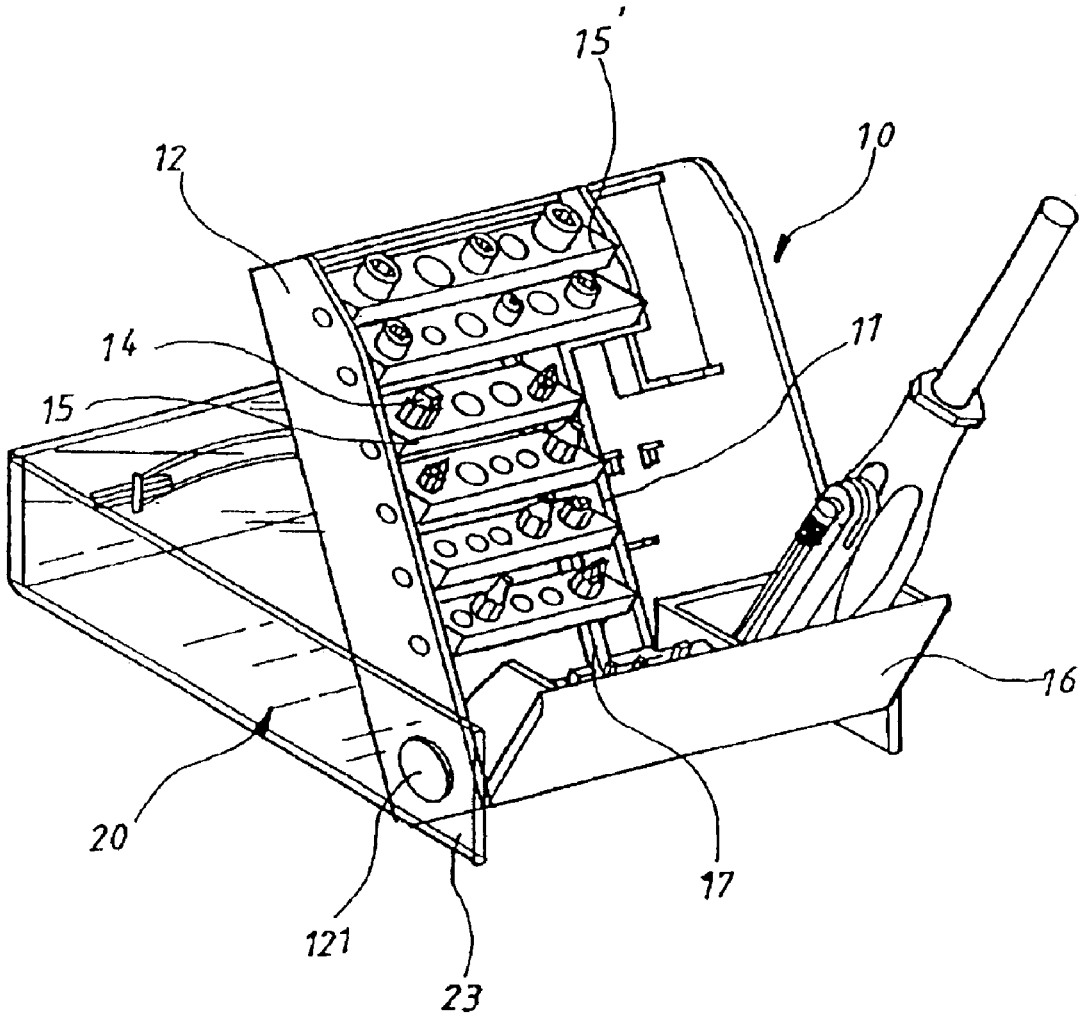
FIG. 4 is a perspective view of the tool box as shown in FIG. 3 wherein an actuating member is pivoted to make receiving members in the base portion to be inclined.

Referring to the drawings and initially to FIGS. 1 and 2, a tool box in accordance with the present invention generally includes a base portion 10 in which a plurality of receiving members 15 and an actuating member 16 are respectively received and a cover 20 mounted to the base portion 10. The base portion 10 has two side walls 12 *and 12a* between which a bottom [13] *100* and a top 101 are respectively transversely connected, a back wall 102 connected between two rear sides of the two side walls 12, *12a*. A separating board 11 is disposed to the back wall 102 and one of the side walls 12*a* and the separating board 11 has a plurality of first apertures 13*a* defined therethrough. The two side walls 12, *12a* of the base portion 10 each have a boss 121 extending from an outer surface thereof.

[Two] *A first* sliding plate[s] 17 [are] *is* respectively and slidably disposed to the side wall 12 having the first apertures 13 and the separating board 11, and [each] the sliding plate 17 has a plurality of second apertures 18 defined therethrough. *A second sliding plate 17a is slidably disposed to the separating board 11, and has apertures 18a defined therethrough.* An auxiliary plate 170 having two apertures 180 defined therethrough is disposed to an extending portion 110 of the separating board 11, wherein a distance between the auxiliary plate 170 to the side wall 12 having the first apertures 13 is larger than a distance between the side wall 12 having the first apertures 13 to the separating board 11 so as to accommodate the two receiving members 15' which is longer then the others.

The receiving members 15 each are pivotally connected between the side wall 12 having the first apertures 13 and the separating board 11 at two ends of a front side thereof and pivotally connected between the sliding plates *17*, *17a* at the two ends of a rear side thereof. In other words, the two ends of the front side of each [the] receiving member 15 each have a first stub 151 extending therefrom so as to be received in the first apertures 13, *13a* of the side wall 12 and the separating board 11. The two ends of the rear side of each [the] receiving member 15 each have a second stub 152 extending therefrom so as to be received in the second apertures 18, *18a* of the two sliding plates 17, *17a*. *The location of the pivotal connection of an end of a receiving member 15 to the side wall 12 is closer to the front side of the receiving member 15 than the rear side thereof, when taken along a first imaginary straight line passing through the pivotal connection of the receiving member to the side wall 12 and through the pivotal connection of the receiving member to the sliding plate 17. The first imaginary straight line is shown at 19 in FIG. 2.*

*With reference to FIG. 1, the sliding plate 17 shown on the left side of the drawing, adjacent side wall 12 having apertures 13, is longer than the other sliding plate 17a disposed adjacent separating board 11, and the sliding plate 17 adjacent side wall 12 engages the stubs 152 of both the shorter receiving members 15 and the longer receiving members 15'. The shorter sliding plate 17a engages only the shorter receiving members 15.*

The actuating member 16 is pivotally connected between the two side walls 12 at two ends of a front side thereof and pivotally connected between the sliding plates 17 at the two ends of a rear side thereof. In other words, the two ends of the front side of the actuating member 16 each have a first shaft 161 extending therefrom so as to be received in lower holes 122 respectively defined through the two side walls 12. The two ends of the rear side of the actuating member [15] *16* each have a second shaft 162 extending therefrom so as to be received in the second apertures 18 of the two sliding plates 17. *The location of the pivotal connection of the end of actuating member 16 to the side wall 12 is closer to the front side of the actuating member than the rear side thereof, when taken along a second imaginary straight line passing through the pivotal connection of the actuating member to the side wall 12 and through the pivotal connection of the actuating member to the sliding plate 17. The second imaginary straight line is shown at 19a in FIG. 2.* The receiving member 15 has a plurality of receiving recesses 153 defined therein so as to receive a tool such as a bit 14 therein and the actuating member 16 has a plurality of receiving portions defined therein so as to receive tools therein.

The cover 20 includes a front plate 200 with two side plates 201 extending from two opposite sides thereof, a top plate 202 connected between the two side plates 201 and two legs 23 extending from each of the two side plates 201. Each of the legs 23 of the cover 20 has a hole 231 defined therethrough so as to receive the boss 121 corresponding thereto. A handle 21 is disposed to the top plate 202 which further has a lock member 22 disposed thereto so as to be engaged with an engaging portion 103 disposed on the top 101 of the base portion 10.

When in use, referring to FIGS. 3 and 4, the cover 20 is pivoted downwardly about the two bosses 121 and turned to a rear side of the base portion 10 so that the cover 20 is able to be put on a desk or the like and the back wall 102 of the base portion 10 is inclinedly leaned on a lower edge of the front plate 200. *The actuating member and receiving members are then in the storage position shown in FIG. 3.* The actuating member 16 is then pivoted about the two first shafts 161 on the front side thereof, the two sliding plates 17, *17a* engaged with the two second shafts 162 are then moved upwardly and the two ends of the rear side of each the receiving member 15 are moved upwardly, *receiving member 15' being moved upwardly by the longer sliding plate 17 adjacent side wall 12.* Therefore, *the actuating member 16 and* the receiving members 15, *15',* are inclined corresponding to a horizontal plane or the desk and the tools in the recess 153 of the receiving members 15 and the receiving portions in the actuating member 16 are easily to be accessed *in the inclined position shown in FIG. 4.*

While particular embodiments of the present invention have been illustrated and described herein, it is not intended to limit the invention and changes and modifications may be made therein within the scope of the invention as hereinafter claimed.

What is claimed is:

1. A tool box comprising:

a base portion having two side walls between which a bottom and a top are respectively transversely connected, a back wall connected between two rear sides of said two side walls;

[two] *one* sliding plate[s] respectively and slidably disposed to *one of* said side walls [corresponding thereto, and]*;* at least one receiving member pivotally connected [between] *to said one of* said [two] side walls at [two] *one* end[s] of a front side [thereof] *of the receiving member,* and pivotally connected [between] *to* said sliding plate[s] at said [two] *one* end[s] of a rear side [thereof] *of the receiving member, wherein a first imaginary straight line passes through the pivotal connection of the receiving member to said one of said side walls and the pivotal connection of the receiving member to the sliding plate, the location of the pivotal connection of said at least one receiving member to said one of said side walls being closer to the front side than to the rear side of said at least one receiving member when taken along said first imaginary straight line;*

*an actuating member pivotally connected between said two side walls at two ends of a front side of the actuating member and pivotally connected to said sliding plate at one end of a rear side of the actuating member so that when pivoting said actuating end of a rear side of the actuating member so that when pivoting said actuating member about said two ends of said front side thereof, said sliding plate is moved upwardly and said rear side of said receiving member is moved upwardly to pivot the receiving member toward an inclined position, wherein a second imaginary straight line passes through the pivotal connection of the actuating member to said one of said side walls and the pivotal connection of the actuating member to the sliding plate, the location of the pivotal connection of the actuating member to said one of said side walls being closer to the front side than to the rear side of said actuating member when taken along said second imaginary straight line; and*

*means mounted to the base portion for covering said at least one receiving member in a closed position and providing access to said at least one receiving member in an open position.*

[2. The tool box as claimed in claim 1 further comprising an actuating member pivotally connected between said two side walls at two ends of a front side thereof and pivotally connected between said sliding plates at said two ends of a rear side thereof so that when pivoting said actuating member about said two ends of said front side thereof, said two sliding plates are moved upwardly and said two ends of said rear side of said receiving member are moved upwardly.]

3. The tool box as claimed in claim 1 [further comprising] *wherein the means for covering comprises* a cover which has a front plate with two side plates extending from two opposite sides thereof, a top plate connected between said two side plates and two legs extending from each of said two side plates, said two legs pivotally connected to said two side walls.

4. The tool box as claimed in claim 3 wherein said two side walls of said base portion each have a boss extending from an outer surface thereof and each of said legs of said cover has a hole defined therethrough so as to receive said boss corresponding thereto.

5. The tool box as claimed in claim 3 wherein said back wall of said base portion inclinedly leans on a lower edge of said front plate when said cover is pivoted downwardly about said two bosses and turned to a rear side of said base portion.

6. The tool box as claimed in claim 1 [or 2] wherein said [two] *one of said* side walls [each have] *has* at least [two] *one* first aperture[s] defined therethrough and said [two] sliding plate[s each have] *has* at least [two] *one* second aperture[s] defined therethrough, said [two] *one* end[s] of said front side of said *at least one* receiving member [each] having a first stub extending therefrom so as to be received in *one of* said *at least one* first aperture[s] of said [two] *one of said* side walls, said [two] end[s] of said rear side of said *at least one* receiving member [each] having a second stub extending therefrom so as to be received in *one of* said *at least one* second aperture[s] of said [two] sliding plate[s].

7. The tool box as claimed in claim 6 wherein said two ends of said front side of said actuating member each [having] *have* a first shaft extending therefrom so as to be received in [said first] apertures of said two side walls, [said two] *and one* end[s] of said rear side of said actuating member each [having] *has* a second [shaft] *stub* extending therefrom so as to be received in *a second of* said *at least one* second apertures of said [two] sliding plate[s].

8. The tool box as claimed in claim 1 wherein said receiving member has a plurality of receiving recesses defined therein.

*9. A tool box comprising:*

*a base portion having a back wall and a first side wall and a second spaced-apart generally parallel sidewall extending from the back wall;*

*a separating board spaced a distance from the first side wall and also spaced from said second sidewall and generally parallel thereto;*

*at least one receiving member pivotally mounted to said first sidewall and between said first sidewall and said separating board at respective pivot points;*

*an actuating member pivotally mounted to said first sidewall and between said first sidewall and said second sidewall, said actuating member being longer than said receiving member; and*

*at least one sliding plate connecting the at least one said receiving member and the actuating member at end locations on the at least one said receiving member and actuating member displaced from said pivot points, whereby rotation of one of said at least one said receiving members and actuating member produces corresponding rotation of any other receiving member and the actuating member so connected by said at least one sliding plate.*

*10. A tool box as defined in claim 9, wherein the at least one sliding plate connects the at least one receiving member and actuating member on the ends thereof pivotally mounted to the first sidewall of said base portion.*

*11. The tool box of claim 10, wherein the at least one receiving member has a plurality of receiving recesses defined therein.*

*12. A tool box as claimed in claim 9, wherein there are more than one receiving members and there are two said sliding plates located one at each end of the receiving members and connecting them.*

*13. The tool box of claim 10, wherein the receiving members have a plurality of receiving recesses defined therein.*

*14. A tool box comprising:*

*a base portion having a back wall and a first side wall and a second spaced-apart generally parallel sidewall extending from the back wall;*

*a separating board having a first portion spaced a first distance from the first side wall and generally parallel thereto and a second portion spaced a second greater distance from the first side wall and generally parallel thereto;*

*at least one receiving member pivotally mounted between said first sidewall and said first portion of said separating board at respective pivot points;*

*at least one longer receiving member pivotally mounted between said first sidewall and said second portion of said separating board; and*

*one sliding plate disposed adjacent said first sidewall and connecting the at least one said receiving member and the at least one longer receiving member at end locations on the said receiving member displaced from said pivot points, whereby rotation of one of said at least one said receiving member produces corresponding rotation of any other receiving member so connected by said at least one sliding plate.*

*15. A tool box claimed in claim 14 and further comprising:*

*an actuating member pivotally mounted between said first sidewall and second sidewall, the sliding plate connecting the actuating member with the receiving members for corresponding rotation therewith.*

*16. A tool box comprising:*

*a base portion having two side walls between which a bottom and a top are respectively transversely connected, a back wall connected between two rear sides of said two side walls;*

*one sliding plate respectively and slidably disposed to one of said side walls;*

*at least one receiving member pivotally connected to said one of said side walls at one end of a front side of the receiving member for pivoting movement of the receiving member between a storage position and an inclined position, and pivotally connected to said sliding plate at said one end of a rear side of the receiving member;*

*an actuating member pivotally connected between said two side walls at two ends of a front side of the actuating member for pivoting movement of the actuating member between a storage position and an inclined position, and pivotally connected to said sliding plate at one end of a rear side of the actuating member so that when pivoting said actuating member about said two ends of said front side thereof, said sliding plate is moved upwardly and said rear side of said receiving member is moved upwardly to pivot the receiving member toward the inclined position; and*

*means mounted to the base portion for covering said at least one receiving member in a closed position and providing access to said at least one receiving member in an open position, said means for covering comprising a cover which has a front plate with two side plates extending from two opposite sides thereof, a top plate connected between said two side plates and two legs extending from each of said two side plates, said two legs pivotally connected to said two side walls.*

*17. The tool box as claimed in claim 16 wherein said two side walls of said base portion each have a boss extending from an outer surface thereof and each of said legs of said cover has a hole defined therethrough so as to receive said boss corresponding thereto.*

*18. The tool box as claimed in claim 16 wherein said back wall of said base portion inclinedly leans on a lower edge of said front plate when said cover is pivoted downwardly about said two bosses and turned to a rear side of said base portion.*

* * * * *